TOTAL REFLECTANCE – MgO AS REFERENCE
MEASURED ON BECKMAN DK-2

SPECTRAL TRANSMITTANCE : CALCULATED TO 2mm THICKNESS

United States Patent Office 3,741,740
Patented June 26, 1973

3,741,740
GLASS-CERAMIC HAVING A REFLECTIVE SURFACE AND PROCESS FOR MAKING SAME
Perry P. Pirooz, Toledo, Ohio, assignor to Owens-Illinois, Inc.
Filed Dec. 6, 1971, Ser. No. 205,354
Int. Cl. C03c 29/00
U.S. Cl. 65—32     10 Claims

ABSTRACT OF THE DISCLOSURE

A glass composition capable of being thermally in situ crystallized to a glass-ceramic having a highly reflective integral surface film, which surface film is resistant to high temperatures, to chemical corrosion and to abrasion, said composition consisting essentially of a $SiO_2$-$Al_2O_3$-$Li_2O$-$Fe_2O_3$ base glass containing a nucleating agent. The base glass contains a sufficient amount of $Fe_2O_3$ to produce a highly reflective surface film on the glass-ceramic formed therefrom. There is also provided a process for preparing a glass-ceramic having such a highly reflective surface film. The glass-ceramic of the invention is particularly useful for lining the interior of cooking and baking ovens and, when the glass-ceramic is a flat plate of a few microns thickness with opposite reflective surfaces, it can be used to split light beams by selective transmittance and reflection.

Figure 1:
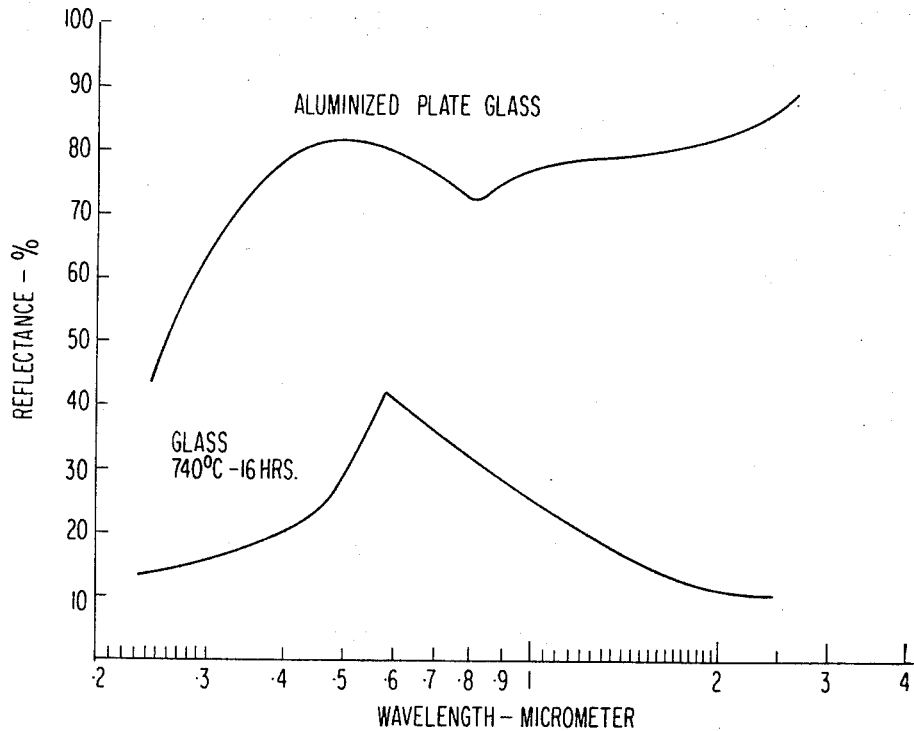

This invention relates to a glass-ceramic having an integral reflective surface film formed thereon and a process for making such a glass-ceramic. More particularly, this invention relates to a thermally crystallizable lithia alumina silicate base glass containing a sufficient amount of $Fe_2O_3$ to produce an integral reflective film on the surface when the glass is heated to produce a thermally in situ crystallizable glass-ceramic.

Glass-ceramic articles and materials have found widespread cemmercial use because of their high flexural strengths, thermal and mechanical shock resistance and other desirable properties. It is known in the art that a metallic surface film can be formed on a glass or glass-ceramic article. However, such films have certain inherent disadvantages. For example, they generally possess poor abrasion resistance in that the reflective surface film or material can readily be abraded or scratched. Also, such reflective surface films or materials generally possess unsatisfactory resistance to either alkali or acid chemical corrosion.

While glass-ceramic materials are known to possess very desirable high temperature properties, including resistance to thermal shock, these desirable high temperature properties were of no advantage when a reflective surface layer of metallic film was formed therein since at such high temperatures, such a reflective surface film is readily damaged or destroyed.

Accordingly, this invention provides a glass-ceramic article or body having integrally formed on at least a portion of its surface an integral, reflective film of relatively high specular (mirror) reflectance which is impervious to high temperatures over extended periods of time, is resistant to chemical corrosion, and is resistant to abrasion.

This invention also provides a novel process of forming glass-ceramic bodies or articles having an integral, reflective film on at least a portion of the surface thereof. The process comprises forming a $SiO_2$-$Al_2O_3$-$Li_2O$-$Fe_2O_3$-nucleant base glass, and subjecting a body formed from such glass to a temperature and for a period of time sufficient to form a glass-ceramic having a high quartz solid solution crystalline phase and a thin reflective film formed on the surface of the glass-ceramic and integral therewith.

A glass-ceramic made in accordance with this invention not only has a highly reflective surface film formed thereon which is resistant to elevated temperatures over extended periods of time, but such glass-ceramic and film possesses a near-to-zero coefficient of thermal expansion, together with the added advantages of low electrical and thermal conductivities. Because of these latter two properties and since the surface film is not subject to attack by hydrochloric acid or nitric acid, it is believed that the reflective film is not a metallic film. The prominent absorption bands attributed to $Fe^{2+}$ were found at the wavelength of about 1.05 and 1.85 $\mu$m. when absorption measurements of the glass were made.

The term "glass-ceramic," as used herein, has the generally accepted meaning known to those skilled in the art. The controlled thermal in situ crystallization of a glass by means of a predetermined heat treatment to produce a glass-ceramic article having increased mechanical strength due to the formation of a crystal structure consisting of small randomly oriented crystals disposed in a glassy matrix is well known in the art. Such glass-ceramic articles are usually made by thermal in situ crystallization of a pre-formed glass object prepared by conventional glass pressing, blowing, casting, or other conventional method of forming glass articles from a melt.

The process of this invention is generally applicable to thermally crystallizable $SiO_2$-$Al_2O_3$-$Li_2O$-nucleant base glasses from which glass-ceramics can be made by thermal in situ crystallization. Such glasses are very well known in the art. The amount of $Fe_2O_3$ to be incorporated in such base glass is that amount which is sufficient to form a thin reflective surface film on the glass-ceramic. The base glass used in this invention is one which will nucleate on heating to form a transparent glass-ceramic of high quartz solid solution crystalline phase, also known as a beta-eucryptite type of crystalline phase. Within this broad range of glasses suitable for making the glass-ceramics of the invention, it has been found that excellent results are obtained when the glass has the following composition expressed in terms of weight percent:

| Ingredients: | Weight percent |
|---|---|
| $SiO_2$ | 60–70 |
| $Al_2O_3$ | 18–22 |
| $Li_2O$ | 3–5 |
| $Fe_2O_3$ | 0.6–5 |
| Nucleant | 2–7 |

Within the term "nucleant" as used above are to be included the well known nucleating agents utilized in forming glass-ceramics by thermally in situ crystallizing a crystallizable glass of the $SiO_2$-$Al_2O_3$-$Li_2O$ system. Among those nucleants or nucleating agents are included $TiO_2$, $ZrO_2$, $SnO_2$, $P_2O_5$, $Cr_2O_3$ and the like or mixtures thereof.

A preferred base glass composition suitable for making the glass-ceramics of the present invention has the following composition expressed as percent by weight:

| Ingredients: | Weight percent |
|---|---|
| $SiO_2$ | 63–68 |
| $Al_2O_3$ | 19–21 |
| $Li_2O$ | 3–4 |
| $Fe_2O_3$ | 2–4 |
| $TiO_2$ | 0–3 |
| $ZrO_2$ | 0–4 |
| $TiO_2+ZrO_2$ | At least 2 |

Several glass-ceramics were made in accordance with the invention from thermally crystallizable glasses formed from the following batches:

TABLE I

| | Batch weights | | | | | | | | |
|---|---|---|---|---|---|---|---|---|---|
| | 1 | 2 | 3 | 4 | 5 | 6 | 7 | 8 | 9 |
| Powdered flint sand | 175.13 | 173.70 | 170.92 | 165.78 | 187.82 | 187.05 | 185.23 | 182.31 | 3,346.8 |
| A-14 alumina (Alcoa) | 63.05 | 62.54 | 61.54 | 59.67 | 63.29 | 63.05 | 62.53 | 61.57 | |
| A-10 alumina (Alcoa) | | | | | | | | | 1,009.0 |
| Lithium carbonate | 28.09 | 27.79 | 27.42 | 26.59 | | 21.38 | 21.17 | 20.82 | 414.7 |
| Lithium zirconate | | | | | 21.40 | | | | 126.7 |
| Zirconia sand | 8.60 | 8.55 | 8.42 | 8.15 | | | | | |
| Zirconia frit | | | | | 24.22 | 24.10 | 23.97 | 23.5c | |
| Titanox—TiO₂ | 5.24 | 5.21 | 5.15 | 4.97 | 5.27 | 5.27 | 5.21 | 5.15 | 85.5 |
| Calcium carbonate | 16.28 | 13.87 | 9.10 | | | | | | 232.1 |
| High calcium lime | | | | | 17.76 | 16.52 | 14.02 | 9.20 | |
| Silicon metal | | | | | | 0.15 | 0.15 | 0.15 | 5.1 |
| Iron oxide | 3.72 | 7.38 | 14.52 | 28.17 | 1.86 | 3.72 | 7.38 | 14.52 | 126.0 |

Three hundred parts by weight of each of the foregoing batches and five thousand parts by weight of the batch of glass No. 9 were melted at a temperature of 1590° F. (1650° F.) for a batch of glass No. 9 for 22 hours with constant stirring. Melts for glasses 1–4 inclusive were prepared in platinum crucibles and an electric furnace while glasses 5–9 inclusive were melted in lava (silica) crucibles and heated in a gas-fired furnace. Each melt was then poured into a mold and cooled to form a glass body. The resulting glasses had the following compositions expressed in weight percent and were subjected to the heat treatment schedule set forth in Table II to form glass-ceramics having a light-reflective thin film formed on the surface thereof and integral with the body. The coefficient of lineal thermal expansion of the glasses and glass-ceramics is also set forth in Table II.

II and the glass rods placed and held in a gradient furnace for 16 hours. The rods were then removed and examined. It was noted that a reflective film formed within the following temperature ranges for each of the resulting glass-ceramics, except for the glass-ceramic of Example 4.

| Glass number: | Temperature range, ° C. |
|---|---|
| 1 | 660–725 |
| 2 | 650–750 |
| 3 | 580–900 |
| 4 | — |
| 5 | 775–840 |
| 6 | 670–775 |
| 7 | 650–750 |
| 8 | 630–775 |
| 9 | 680–720 |

The glass-ceramic of Example 4 formed a non-reflective steel-grey film on its surface. All of the other glass-ceramics formed reflective films when subjected to heat

TABLE II

| | Glass Number | | | | | | | | |
|---|---|---|---|---|---|---|---|---|---|
| | 1 | 2 | 3 | 4 | 5 | 6 | 7 | 8 | 9 |
| Ingredients: | | | | | | | | | |
| SiO₂, weight percent | 67.4 | 66.9 | 65.8 | 63.8 | 67.7 | 67.4 | 66.9 | 65.8 | 66.8 |
| Al₂O₃, weight percent | 20.9 | 20.7 | 20.4 | 19.8 | 21.0 | 20.9 | 20.7 | 20.4 | 20.6 |
| Li₂O, weight percent | 3.8 | 3.7 | 3.7 | 3.6 | 3.8 | 3.8 | 3.7 | 3.7 | 3.8 |
| TiO₂, weight percent | 1.7 | 1.7 | 1.7 | 1.6 | 1.7 | 1.7 | 1.7 | 1.7 | 1.7 |
| ZrO₂, weight percent | 1.9 | 1.9 | 1.9 | 1.8 | 1.9 | 1.9 | 1.9 | 1.9 | 1.9 |
| Fe₂O₃, weight percent | 1.2 | 2.5 | 4.8 | 9.4 | 0.6 | 1.2 | 2.5 | 4.9 | 2.5 |
| Si, weight percent | | | | | | 0.05 | 0.05 | 0.05 | 0.1 |
| CaO, weight percent | 3.0 | 2.6 | 1.7 | | 3.3 | 3.1 | 2.6 | 1.7 | 2.6 |
| Mole percent Fe₂O₃ | 0.5 | 1.0 | 2.0 | 4.0 | 0.25 | 0.5 | 1.0 | 2.0 | 1.0 |
| Coeff. of thermal expansion: | | | | | | | | | |
| α×10⁻⁷ (0–300° C.): | | | | | | | | | |
| Glass | 43.2 | 43.2 | 41.8 | 42.3 | 40.2 | 39.9 | 39.2 | 37.3 | 39.5 |
| Glass-ceramic temp. ° C. (hours): | | | | | | | | | |
| 750 (16)+850 (1) | 0.4 | 0.0 | 9.3 | 12.8 | | | | | |
| 740 (16)+825 (1) | | | | | | 0.0 | −0.3 | 0.9 | 4.7 |
| 800 (16) | | | −1.1 | 4.5 | 7.4 | 1.7 | 2.5 | 0.0 | |
| 725 (4)+850 (1) | | | | | | | | | −0.5 |

Each of the glass-ceramics produced by the heat treatment described in Table II had zero to near-to-zero coefficients of lineal thermal expansion over a 0–300° C. range, and had a thin but highly reflective integral surface film which is thermally stable to about 1000° C., with the exception of the glass-ceramic of Example 4. This glass-ceramic had a non-reflective steel grey film formed on its surface. The reflective films give the surface of the glass-ceramics a mirror-like appearance.

While the reflective surface films are formed when the thermally crystallizable glasses are subjected to heat within the range of about 575°–900° C. and preferably within the range of 650°–750° C. over a period of time, it has been found that each of the glasses has a definite temperature range within which the reflective surface film forms on the surface of the resulting glass-ceramic. If the glasses are subject to crystallization temperatures outside the specific range for each glass, then no reflective film will form on the surfaces. Furthermore, if the crystallization temperatures used are above the necessary ranges, not only will the reflective film surface not form, but the glass-ceramic which is produced may be opaque instead of transparent.

Rods were formed of each of the nine glasses of Table within the above designated temperature ranges. Furthermore, each of the glass-ceramic bodies were transparent to light, although the color of each body varied, depending upon the amount of Fe₂O₃ used in preparing the glass-ceramic. The color varied from light brown or amber to brownish-green to black. The film formed in the glass-ceramic of Example 1 had a silver tone, that of Example 2 was slightly greenish while that formed with Example 8 had a gold tone.

To characterize the reflective surfaces formed and to obtain some quantitative evaluation thereof, total reflectance measurements were made on a plate sample of the glass-ceramic of Example 7, which had previously been heated at 740° C. for 16 hours in an air atmosphere. The measurements were made in the wave length range of 0.25 to 2.5 μm. using the Beckman DK–2A instrument which was fitted with an integrating sphere freshly coated with MgO. Similar measurements were made on a glass plate, vacuum-coated with aluminum, which produced a highly reflective mirror.

FIG. 1 presents both of these reflectance curves for comparative purposes. The aluminized plate shows about 80% or more reflectance beyond 0.4 μm. wave length and approaches 90% at 2.5 μm., which is believed to be the maximum attainable specular reflectance from any material. The glass-ceramic film reflectance, however, appears to be more specific as a function of the wave length, reaching a maximum of approximately 41% at 0.58 μm. and gradually decreasing in either direction of change in the frequency of the incident radiations. Both the iron oxide concentration and the sample heat treatments will significantly influence the nature of the reflectance that is produced on the glass-ceramic surface films of the invention.

Spectral absorption of the film formed on the glass-ceramics was investigated by obtaining absorption curves for a sample of glass No. 9, in which the influence of the bulk glass was minimized by reducing the specimen thickness to 0.3 mm. prior to the film-generating heat treatments. The light absorption measurements were made on the Cary 14 spectrophotometer for samples having the following thermal history:

(A) annealed glass—brownish-green with no reflective film;
(B) (650° C.—64 hours) brownish-green bulk with a highly-reflective surface;
(C) (725° C.—4 hours)+(850° C.—1 hour) light brown interior with a very thin reflective film.

Figure 2A:
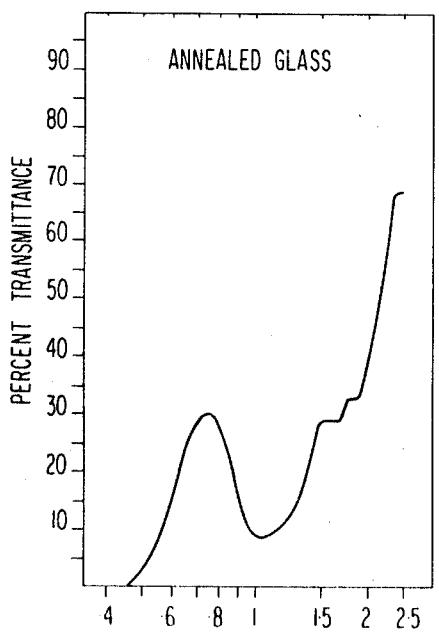
Figure 2B:
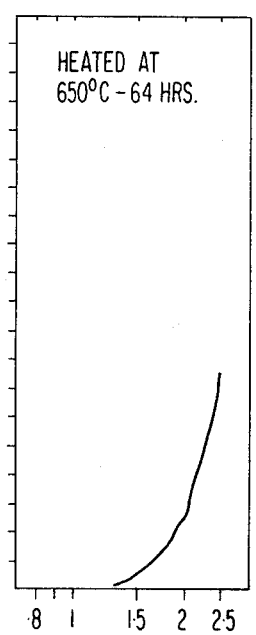
Figure 2C:
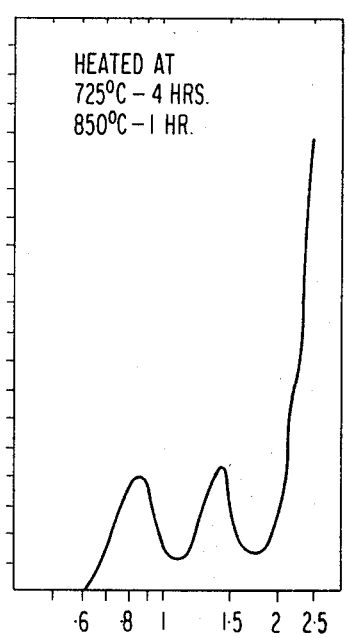

FIGS. 2, 2B and 2C of the drawing show the transmittance versus wave length curves for the above samples. Sample A, which had no reflective film, exhibited a very prominent absorption band at about 1.05 μm. and a shoulder in the 1.5 to 2.0 μm. range.

Sample B had a highly reflective film which produced no transmittance up to about 1.25 μm., above which the transmittance increased gradually at least about 40% at 2.25 μm. but no distinct absorption bands were detected.

Example C produced two very prominent absorption bands at about 1.10 and 1.75 μm. The transmittance for Example C does not exceed 25% for 2 mm. sample thicknesses up to about 2.0 μm. wave length, beyond which the transmittance is increased rapidly and reaches about 80% at 2.5 μm.

When a thin plate of glass-ceramic of Example 9, having reflective films formed on opposite sides, had a beam of light shine on it at an angle perpendicular to the plane of the plate, all of the light was reflected therefrom. The plate acted in the same manner as a mirror. When the beam of light shone on the plate at an angle of about 45° some of the light passed through the plate and the remainder was reflected from the surface. Thus, light beams incident upon the plate are either totally reflected from the surface or partially transmitted through the plate dependent upon the angle of the incidence.

As shown in Table II above, the thermally crystallizable glass can be heat treated to thermally in situ crystallize it to a glass-ceramic by subjecting it to a single temperature for a period of time to complete the crystallization or it can be subjected to a specified temperature for a specified time and then be heated to a higher temperature for a shorter period of time to complete the crystallization of the glass-ceramic. However, it is important that the heat treatment of the glass be conducted in an oxygen-containing atmosphere, such as air. Use of a reducing atmosphere prevents the formation of the reflective film. In fact, a reflective film formed on a glass-ceramic in accordance with the invention can be removed by subjecting it to heat in a reducing atmosphere. When samples of glass-ceramic of Example 9 having reflective surfaces were reheated in argon, or $H_2$ or in a forming gas ($N_2+H_2$) atmosphere, the reflective film disappeared. This phenomenon permits one to remove the reflective film from certain areas of the glass-ceramic and permit it to be retained in other areas merely by covering these latter areas to prevent their contact with the reducing atmosphere.

The thickness and color of the reflective film are dependent on both the iron concentration in the glass and the total heat treatment. Based on 16-hour treatments the glass of Example 7 produces a silver-tone finish while the glass of Example 8 produces a gold-tone reflective surface.

Thermal stability of the reflective films was ascertained by subjecting the films to high temperatures for extended periods of time to ascertain the temperature at which the film deteriorated. Up to about 1000° C., no visible deterioration of the films was noted. Thermal stability tests in air of a number of samples of the reflective glass-ceramic of Example 7 showed that the reflective surface deteriorated at temperatures of about 1000 to 1050° C. after heating times varying from 18 to 140 hours.

Samples of glass-ceramics of the invention having reflective surfaces were immersed in various acids including 7.3% HCl, 37% HCl, 12.6% $HNO_3$ and 9.87% $H_2SO_4$. Several glass-ceramic samples were also immersed in 50% NaOH and 5% NaOH solutions. The acids and bases were maintained at a temperature of 194° F. and the respective glass-ceramics remained immersed therein for 24 hours.

Very low corrosion rates were obtained in the 7.3% HCl solution, and no weight loss was detected in the 37% HCl, the $HNO_3$ or the $H_2SO_4$ solution. The reflective surface was completely removed in the 50% NaOH solution whereas in the 5% NaOH solution, the removal was only partial. Further it was ascertained that the chemical corrosion rate of acids on glass-ceramics having reflective surface films of the invention was considerably less than the corrosion rate of these same acids on several other glass-ceramics of the prior art and on other surfaces including soda-lime glass, borosilicate glass, stainless steel, and also the well known stainless steels preferred to as Hastelloy C and Hastelloy G. The corrosion rate of the 5% NaOH was less on the glass-ceramics having reflective films of the invention than it was on the other glass-ceramics, on the soda-lime glass and on the borosilicate glass. The corrosion rate with 50% NaOH was less on the glass-ceramics of the invention than it was on the other glass-ceramics tested and on the borosilicate glass.

While glass-ceramics having a zero or near-to-zero coefficient of lineal thermal expansion can be produced and are the most desirable for the purpose of this invention, the actual coefficient of lineal thermal expansion will be determined to a great extent by the composition of the thermally crystallizable glass which is used. While the coefficient can be outside the broader range of $\pm 12 \times 10^{-7}$ (0–300° C.), for some purposes, it is preferred to have the coefficient within the range of $\pm 5 \times 10^{-7}$ (0–300° C.) for most purposes.

The basic composition of the thermally crystallizable glass used to make the glass-ceramics with reflective surface films of the present invention consists essentially of $SiO_2$, $Al_2O_3$, $Li_2O$, $Fe_2O_3$ and a nucleant. Other metal oxide modifiers, such as BaO, CaO, MgO, $Na_2O$, $K_2O$, etc. may be present in small amounts as required to improve the working properties of the glass such as to lower viscosity, improve the liquidus, etc., but any such oxide or mixtures of oxides must be compatible with the compositions of the glass and must not deleteriously affect the reflective surface film forming properties of the glass-ceramics. Such other metal oxides should be present in amounts of less than 10 percent by weight of the total glass composition and preferably less than 4 percent by weight of such composition.

Si metal was added in some of the glasses of Table II to provide reducing conditions within the melt. In general, the reduced melts showed less visible light transmission than the oxidized melts.

The amount of $Fe_2O_3$ necessary in the thermally crystallizable glass is that amount which will provide a thin reflective integral surface film on the glass-ceramic when the glass of a particular composition is heated in an oxygen-containing atmosphere at elevated temperatures for the necessary time. As seen in Table II wherein the amount of $Fe_2O_3$ is expressed in weight percent and in mole percent, thin reflective films are formed when as low as 0.25 mole percent $Fe_2O_3$, based on the mole composition of the total composition, is used. Good films are also obtained when 0.5, 1.0 and 2.0 mole percent $Fe_2O_3$ is present in the composition, although when 4.0 mole percent was used in a specific composition, Example 4, a non-reflective film was formed. Thus it is difficult to specify the exact amount of $Fe_2O_3$ that must be present in the base glass composition, other than to state that the amount must be sufficient to provide the reflective surface film on the glass-ceramic formed from such base glass.

It will be readily apparent from the foregoing discussions that a number of articles of manufacture can be made using the process of this invention, including cookware, cooking pans, laboratory ware and equipment, etc., where the interior of the ware has a reflective surface to enable one to better view the items being cooked or baked or heated therein. Such glass-ceramic articles are characterized by good light reflectance at high temperatures, high resistance to thermal shock and good resistance to chemical corrosion. Furthermore decorative art works, such as vases, figurines and other molded works, containers such as cosmetic bottles and the like, wherein the outer surfaces have a mirror appearance could be made in accordance with the process of the invention.

The glass-ceramics of this invention are particularly useful to form linings for the interior of cooking and baking ovens. For example, the walls, roof and floor of the interior chamber of an oven can be provided with the high temperature reflective crystalline glass-ceramics made from the composition of this invention, so as to enable the user to see all exposed surfaces of the product being cooked or baked. It will of course be understood that any one or all of the interior oven surfaces can be provided with the ceramic material. Because of low heat conductivity properties of the glass-ceramics, less insulation has to be used in making the ovens, thus affording an opportunity to reduce the overall bulk of the oven. It will be apparent to those skilled in the art that several means can be employed to utilize the glass-ceramics of the invention. For example, the entire portion of a wall, the roof or floor can be fabricated from the crystalline glass-ceramic using the methods previously described.

Other uses for ceramics made from the composition of this invention will be apparent to those skilled in the art knowing its advantageous properties. Among these properties are near-to-zero thermal expansion, good light reflectance, high thermal stability, good hardness and abrasion and scratch resistance, good resistance to chemical corrosion, and low electrical and thermal conductivity. The composition of this invention is also advantageous since it is composed of relatively low cost raw materials.

I claim:

1. In a process for treating a glass of the $SiO_2$-$Al_2O_3$-$Li_2O$-nucleant system, thermally crystallizable to form a glass-ceramic containing a high quartz solid solution phase, comprising subjecting said glass to heat for a period of time sufficient to thermally in situ crystallize said glass to a transparent glass-ceramic, the improvement whereby said glass-ceramic has a reflective integral surface film formed thereon, said improvement consisting essentially of incorporating in said thermally crystallizable glass a sufficient amount of $Fe_2O_3$ to prodce said reflective integral surface film on said glass ceramic during said thermal in situ crystallization of said glass, said heating being effected in a non-reducing atmosphere.

2. The process as defined in claim 1 wherein said $Fe_2O_3$ is present in said glass in an amount of at least about 0.25 mole percent of said glass.

3. The process as defined in claim 1 wherein said $Fe_2O_3$ is present in said glass in an amount of from 0.6 to 5.0 weight percent of said glass.

4. The process as defined in claim 1 wherein said temperature at which said glass is thermally in situ crystallized to glass-ceramic is within the range of about 575 to 900° C.

5. The process as defined in claim 3 wherein said temperature at which said reflective film is formed is within the range of about 650 to 750° C.

6. The process as defined in claim 1 wherein said glass consists essentially of the following:

| Ingredients: | Weight percent |
|---|---|
| $SiO_2$ | 60–70 |
| $Al_2O_3$ | 18–22 |
| $Li_2O$ | 3–5 |
| $Fe_2O_3$ | 0.6–5 |
| Nucleant | 2–7 |

7. The process as defined in claim 6 wherein said temperature at which said glass is thermally in situ crystallized to glass-ceramic is within the range of about 575 to 900° C.

8. The process as defined in claim 6 wherein said temperature at which said reflective film is formed is within the range of about 650–750° C.

9. The process as defined in claim 1 wherein said glass consists essentially of the following:

| Ingredients: | Weight percent |
|---|---|
| $SiO_2$ | 63–68 |
| $Al_2O_3$ | 19–21 |
| $Li_2O$ | 3–4 |
| $Fe_2O_3$ | 2–4 |
| $TiO_2$ | 0–3 |
| $ZrO_2$ | 0–4 |
| $TiO_2+ZrO_2$ | At least 2 |

10. A glass ceramic article having a reflective film on the surface thereof and integral therewith made in accordance with the process defined in claim 1.

References Cited

UNITED STATES PATENTS

| 3,146,114 | 8/1964 | Kivlighn | 106—39 DV |
| 3,454,386 | 7/1969 | Ernsberger | 65—33 |
| 3,503,763 | 3/1970 | Mills | 65—33 X |
| 3,535,098 | 10/1970 | Babcock | 65—33 |
| 3,627,548 | 12/1971 | Hammar et al. | 65—33 X |

ROBERT L. LINDSAY, JR., Primary Examiner

U.S. Cl. X.R.

65—33; 106—39 DV, 60